(12) United States Patent
Wang

(10) Patent No.: US 7,248,856 B2
(45) Date of Patent: *Jul. 24, 2007

(54) SYSTEM AND METHOD FOR CLIENT-SERVER-BASED WIRELESS INTRUSION DETECTION

(75) Inventor: Huayan Amy Wang, Hauppauge, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/800,556

(22) Filed: Mar. 15, 2004

(65) Prior Publication Data

US 2005/0202800 A1  Sep. 15, 2005

(51) Int. Cl.
*H04M 1/66* (2006.01)
(52) U.S. Cl. .................. 455/411; 455/410; 455/426.2
(58) Field of Classification Search ............. 455/456.5, 455/456.1, 410, 411; 370/328, 389
See application file for complete search history.

(56) References Cited

U.S. PATENT DOCUMENTS

| 6,873,617 | B1* | 3/2005 | Karras | 370/389 |
| 2003/0142641 | A1* | 7/2003 | Sumner et al. | 370/328 |
| 2005/0032531 | A1* | 2/2005 | Gong et al. | 455/456.5 |
| 2005/0136891 | A1* | 6/2005 | Wang et al. | 455/410 |

\* cited by examiner

*Primary Examiner*—Temica Beamer
*Assistant Examiner*—Joy Contee
(74) *Attorney, Agent, or Firm*—Baker Botts L.L.P.

(57) ABSTRACT

A system and method for detecting unauthorized use of a wireless local area network is described, wherein the network includes mobile units that communicate with at least one access point. First network traffic data is accumulated at a mobile unit. Second network traffic data is accumulated at an access point. The first and second traffic data is communicated to a computer and is correlated by the computer to identify non-correlated traffic data. An alarm condition is signaled when the non-correlated traffic data exceeds a threshold.

21 Claims, 2 Drawing Sheets

SYSTEM AND METHOD FOR CLIENT-SERVER-BASED WIRELESS INTRUSION DETECTION

BACKGROUND OF INVENTION

The present invention relates to wireless local area networks (WLANs). In particular the invention relates to methods for detecting unauthorized access or attempted access to the wireless local area network.

The tremendous success of WLAN has made it a popular target of hackers (known as "whackers") who are actively developing new methods for attacking and intruding WLANs. New WLAN hacking tools are published on the internet at an alarming rate. Many industry surveys show that WLAN security is the top concern for most corporate Chief Information Officers considering WLAN deployment. Unfortunately, contemporary WLAN security solutions are either flawed or unproven.

In co-pending application Ser. No. 09/528,697, filed Mar. 17, 2000, which is owned by the assignee of the present application and incorporated herein by reference, there is described a system which follows the protocol of IEEE Standard 802.11, but which uses a combination of RF Ports (also called "access ports") and Cell Controllers to perform the functions of Access Points of a classical 802.11 data communications system. Lower level MAC functions are performed by the RF Ports and higher level MAC functions, including association and roaming functions, are performed by the cell controller. The term "access point" as used herein is intended to include conventional access points, such as those which follow the protocol of IEEE Standard 802.11 and perform all MAC functions, as well as RF Ports operating with cell controllers, as described in the incorporated co-pending application.

In co-pending application Ser. No. 10/679,524, filed Oct. 6, 2003, which is owned by the assignee of the present application and incorporated herein by reference, there is described a system for use in a wireless local area data communications network wherein mobile units communicate with access points, and wherein the system is arranged to locate transmitters using signals transmitted by the transmitters. A database relating authorized transmitters to location is maintained. Selected signals are detected at the access points and location data corresponding to the selected signals for use in locating a source of the signals is recorded. The source is located using the location data, and the source location is compared to a corresponding location in the database. An alarm is signaled if the source location is inconsistent with the corresponding database location.

It is an object of the present invention to provide an improved system and method for detecting unauthorized access or attempted access to a WLAN.

SUMMARY OF THE INVENTION

In accordance with the invention there is provided a method for detecting unauthorized use of a wireless local area network having at least one mobile unit that communicates with at least one access point. First network traffic data is accumulated at a mobile unit. Second network traffic data is accumulated for the access points. The first and second traffic data is communicated to a computer and correlated in the computer to identify non-correlated traffic data. An alarm condition is signaled when the non-correlated traffic data exceeds a threshold portion of the traffic data.

In another embodiment of the present invention, a system for detecting unauthorized use of a wireless local area network which includes a mobile unit, an access point, and a server computer, wherein first network traffic data is accumulated by the mobile unit, second network traffic data is accumulated by the access point, and the first and second network traffic data are communicated to the server computer. The server computer correlates the traffic data to identify any non-correlated traffic data, and an alarm condition is signaled when said non-correlated traffic data exceeds some threshold.

The first traffic data may include number of transmitted messages for the mobile unit, destination address of the transmitted messages, number of received messages for the mobile unit, source address of the received messages, a record of association requests of the mobile unit with access points, a record of disassociation transactions, number of broadcast and multicast frames received by the mobile unit or a record of authentication requests. The second traffic data may include number of transmitted messages for the access point, destination address of the transmitted messages, number of received messages for the access point, source address of the received messages, record of association requests of mobile units with the access points, a record of disassociation transactions, number of broadcast and multicast frames sent by the access point or a record of authentication requests. The traffic data may be sent to the computer at periodic intervals or in response to a command signal sent from the computer.

In accordance with the invention there is provided an improvement in a mobile unit having a processor and a radio and arranged to communicate with a computer. The processor of the mobile unit is arranged to accumulate traffic data representing communications with access points connected to the computer and to communicate accumulated traffic data to the computer.

For a better understanding of the present invention, together with other and further objects thereof, reference is made to the following description, taken in conjunction with the accompanying drawings, and its scope will be pointed out in the appended claims.

DESCRIPTION OF THE INVENTION

Figure 1:
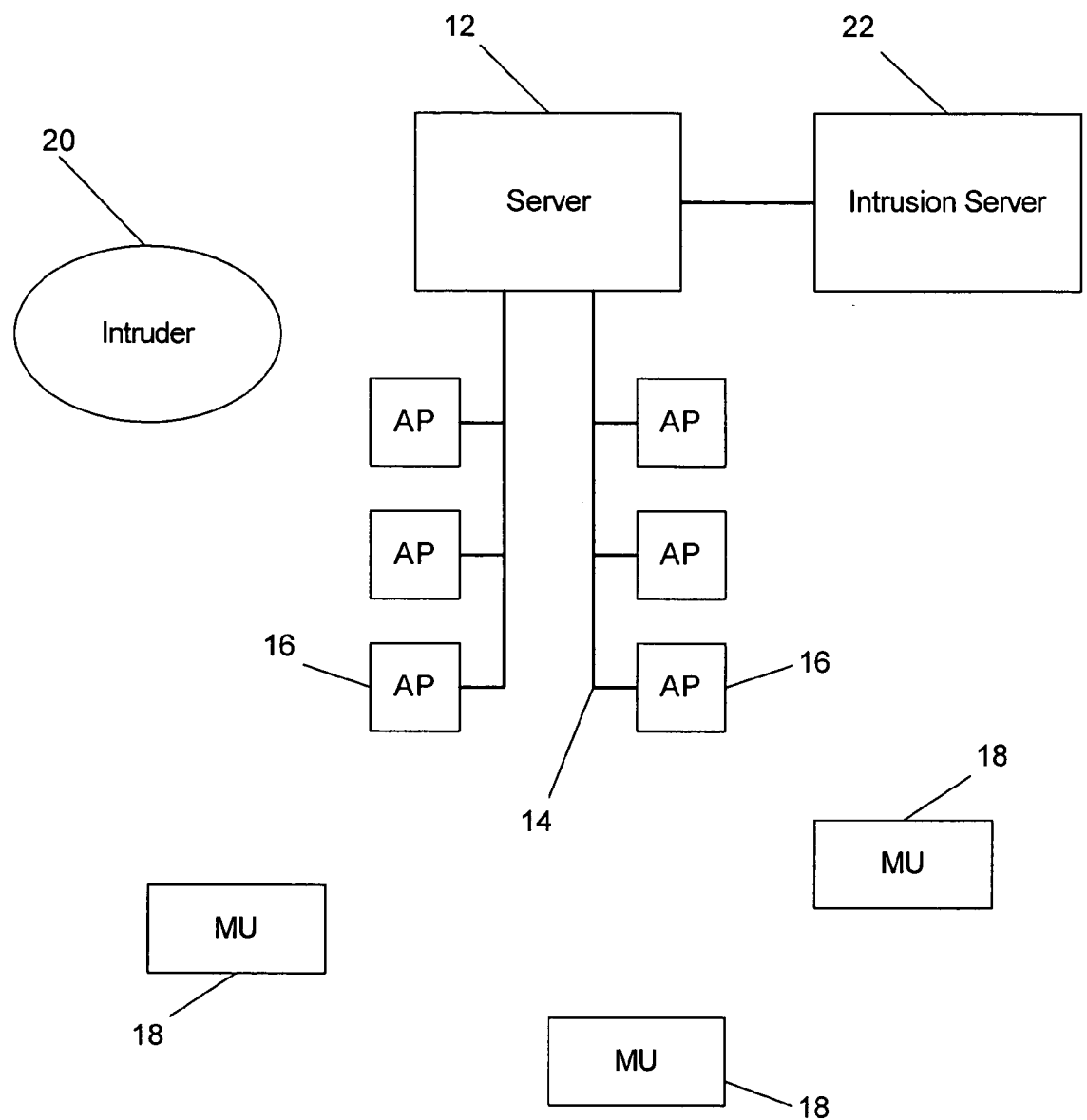
FIG. 1 is a block diagram illustrating a wireless local area network in which the method of the present invention may be practiced.

Referring to FIG. 1 there is shown a wireless local area network 10 having a server 12 connected over a wired network 14 to a plurality of access points 16. Network 10 may operate according to a standard protocol, such as IEEE Standard 802.11 to provide wireless network data communications between mobile units 18 and server 12.

The present invention provides a method for detecting that an intruder 20 is using or attempting to use the system. According to the method, traffic data is accumulated at mobile units 18 and access points 16, which may comprise a cell controller and RF Ports as described in the incorporated co-pending application. Ideally the data relates to specific messages and management signals and can be correlated. For example, in ideal conditions the number of messages sent by an access point 16 should equal the number of messages received by the mobile unit 18 and vice versa.

In one arrangement according to the method of the invention the access points 16 may accumulate traffic data representing the number of messages sent to each mobile unit 18 and acknowledged by the mobile unit 18. At the mobile unit 18 the number of messages received and acknowledged is accumulated as traffic data. Periodically the traffic data accumulated by the access point 16 and the traffic data accumulated by the mobile unit 18 are sent by data communications over the wireless and wired networks 10, 14 to computer 12 for analysis. In an optional arrangement an intrusion server 22 may receive the traffic data from computer 12 and perform analysis thereof. In order to analyze the data an attempt is made to correlate the messages sent by the access points 16 to the messages received and acknowledged by the mobile unit 18 to which the messages were addressed.

In a similar manner the mobile unit can accumulate traffic data representing messages sent by the mobile unit 18 to an access point 16 and the access points can accumulate traffic data representing messages received from each mobile unit 18 that the access point 16 has received and acknowledged. This traffic data is sent to the computer 12 or intrusion server 22 for analysis.

In the event there is a significant difference between the messages sent over the network and received by authorized elements of the network, for example more than 10% of the messages cannot be correlated, the computer 12 or intrusion server 22 will signal that an intrusion into the system may have occurred. This would imply that an intruder 20 has sent or acknowledged signals masking itself as an authorized user of the system. It is noted that this 10% threshold is provided only for exemplary purposes, and that the most effective threshold will largely depend on the configuration of the wireless network. In another exemplary embodiment of the system and method of the present invention, the threshold may not be a fixed value, but rather may be dynamically adjusted to account for traffic losses due to noise, packet collisions, etc.

The correlation can be evaluated for the system as a whole or for individual transceivers. If evaluation is to take place on the basis of individual transceivers, the traffic data may include the source address of each message received and the destination address of each message sent. In addition the traffic data would be sent to the computer 12 or intrusion server 22 in a packet that identifies the transceiver at which the data was gathered, such as the BSS ID of the 802.11 system. With this information the computer 12 or intrusion server 22 can correlate the source and destination of each completed packet, for example packets that have been acknowledged.

In a variation of the method of the invention the analysis may concentrate on certain types of messages that may be used in an intrusion attempt. For example, the mobile unit may record as traffic data each association request transmitted by the mobile unit 18. In addition the mobile unit 18 may record in the traffic data information on whether authentication or association was granted for each association request. Of particular importance to detect man-in-the-middle type intrusion the mobile unit 18 can record disassociation transactions.

For purposes of correlation of traffic data each access point 16 can store and send traffic data corresponding to association requests received from mobile units 18, events representing granting of association or authentication, and disassociation transactions performed by the access point. Other events which may be collected in an exemplary embodiment of a system and method according to the present invention may include login attempts, login failures, retries, probe requests sent, probe requests received, number of multicast frames sent/received, number of broadcast frames sent/received, amount of data traffic sent/received, etc. It is noted that the scope of the invention is not limited to systems and methods which collect only these data categories, as one of ordinary skill in the art would understand.

In still another arrangement of a method according to the invention the mobile units 18 can record events that may indicate an intruder 20 is attempting to enter the system. One such event is a broadcast or multicast message wherein an intruder 20 is attempting to appear as an access point. These messages can be recorded as traffic data, while the access points 16 record traffic data corresponding to authentic broadcast and multicast messages. The recorded data traffic is sent to the computer 12 or intrusion server 22 for correlation.

The traffic data may be sent to the computer 12 or intrusion server 22 at pre-set periodic intervals, for example every hour. In the case of mobile units 18 the traffic data can be sent only while the mobile unit is associated with an access point. In this case, the mobile unit 18 may send the traffic data at the end of an association, as part of the disassociation function.

In an alternate arrangement traffic data can be sent upon receipt of a command message from the computer 12 or the intrusion server 22.

In another alternate arrangement, the intrusion server 22 may dynamically instruct mobile units 18 and/or access points 16 regarding which data statistics to collect.

In yet another alternate arrangement, a security protocol may be used to transmit the traffic data to the computer 12 or intrusion server 22. In a preferred embodiment, the protocol used may be the Secure Sockets Layer protocol (SSL), though the invention is not limited to use of this protocol.

Figure 2:
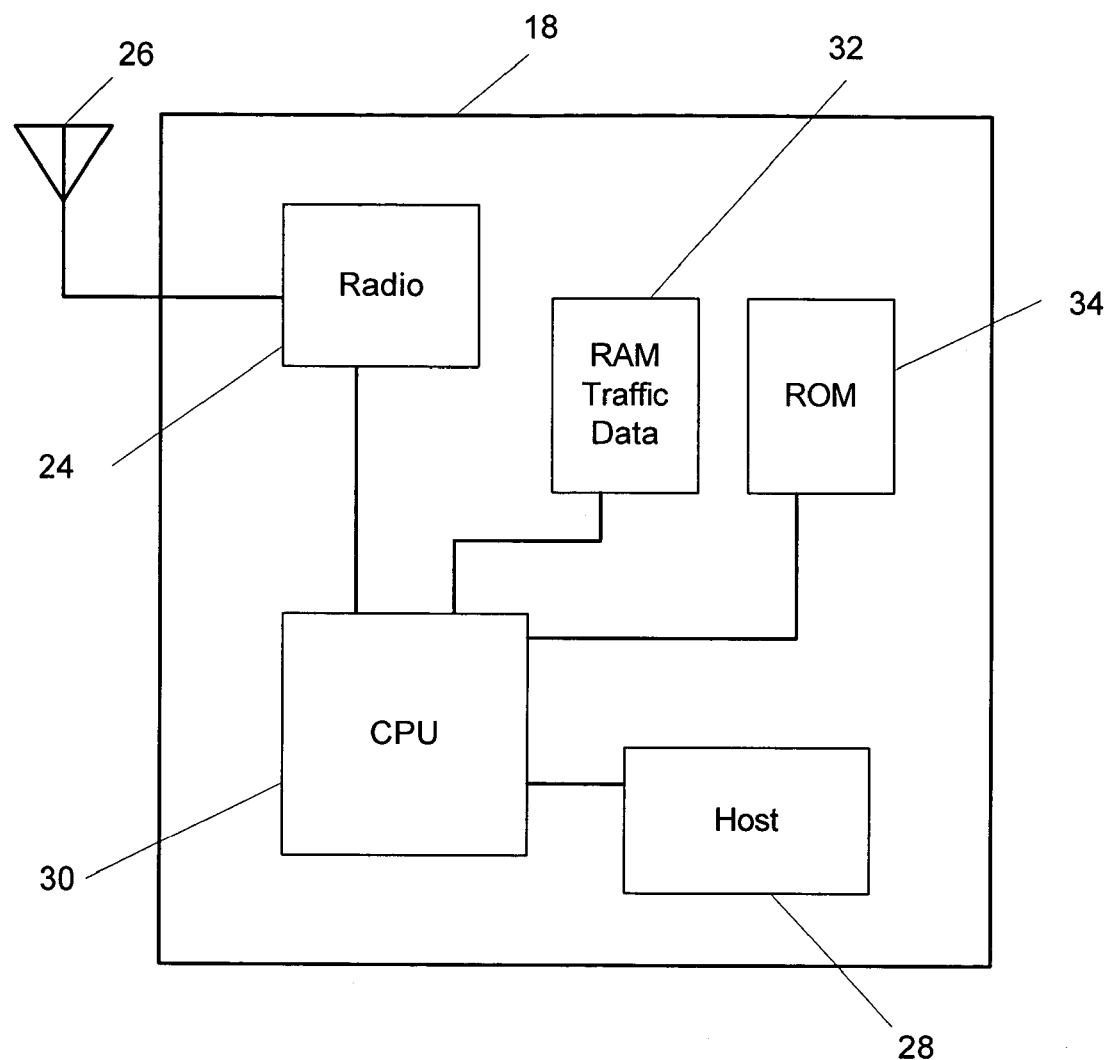
FIG. 2 is a block diagram showing an embodiment of an improved mobile unit in accordance with the invention.

FIG. 2 shows a block diagram of a mobile unit 18 that may be used in practicing the method of the invention. The mobile unit includes a radio 24 for sending and receiving data packets, a processor 30 for controlling the radio according to a data communications protocol, such as IEEE Standard 802.11. The mobile unit includes read-only memory 34 and random access memory 32, which may be part of a microcomputer which includes processor 30 or part of a digital signal processor. Read-only memory 34 includes program instructions for operating processor 30, including instructions for accumulating traffic data in random access memory 32. Processor 30 is also interfaced to the host system 28, such as a portable computer, telephone or personal digital assistant.

While there have been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

I claim:

1. A method for detecting unauthorized use of a wireless local area network having at least one mobile unit that communicates with at least one access point, comprising:

accumulating first network traffic data at a mobile unit;
accumulating second network traffic data at an access point;
communicating said first and second traffic data to a computer; and
correlating said first and second traffic data in said computer to identify non-correlated traffic data indicative of unauthorized use of the wireless local network and signaling an alarm condition when said non-correlated traffic data exceeds a threshold portion of said traffic data.

2. A method as specified in claim 1 wherein said first traffic data includes number of transmitted messages for said mobile unit.

3. A method as specified in claim 2 wherein said first traffic data includes destination address of said transmitted messages.

4. A method as specified in claim 1 wherein said first traffic data includes number of received messages for said mobile unit.

5. A method as specified in claim 4 wherein said first traffic data includes source address of said received messages.

6. A method as specified in claim 1 wherein said first traffic data includes a record of association requests of said mobile unit with said access point.

7. A method as specified in claim 1 wherein said first traffic data includes a record of disassociation transactions.

8. A method as specified in claim 1 wherein said first traffic data includes number of broadcast and multicast frames received by said mobile unit.

9. A method as specified in claim 1 wherein said first traffic data includes a record of authentication requests.

10. A method as specified in claim 1 wherein said second traffic data includes number of transmitted messages for said access point.

11. A method as specified in claim 10 wherein said second traffic data includes destination address of said transmitted messages.

12. A method as specified in claim 1 wherein said second traffic data includes number of received messages for said access point.

13. A method as specified in claim 10 wherein said second traffic data includes source address of said received messages.

14. A method as specified in claim 1 wherein said second traffic data includes a record of association requests of mobile units with said access point.

15. A method as specified in claim 1 wherein said second traffic data includes a record of disassociation transactions.

16. A method as specified in claim 1 wherein said second traffic data includes number of broadcast and multicast frames sent by said access point.

17. A method as specified in claim 1 wherein said second traffic data includes a record of authentication requests.

18. A method as specified in claim 1 wherein said communicating said traffic data to a computer is repeated on a periodic basis.

19. A method as specified in claim 1 wherein said communicating said traffic data to a computer is in response to a command signal from said computer.

20. A method for detecting unauthorized use of a wireless local area network having at least two mobile units that communicate with at least one access point, comprising:

accumulating first network traffic data at a first mobile unit;
accumulating second network traffic data at a second mobile unit;
communicating said first and second traffic data to a computer; and
correlating said first and second traffic data in said computer to identify non-correlated traffic data indicative of unauthorized use of the wireless local network and signaling an alarm condition when said non-correlated traffic data exceeds a threshold portion of said traffic data.

21. A system for detecting unauthorized use of a wireless local area network, comprising:

at least one mobile unit;
at least one access point; and
at least one server computer,
wherein first network traffic data is accumulated by said at least one mobile unit, second network traffic data is accumulated by said at least one access point, said first and second network traffic data are communicated to said at least one server computer, said first and second network traffic data are correlated by said at least one server computer to identify non-correlated traffic data indicative of unauthorized use of the wireless local area network, and an alarm condition is signaled when said non-correlated traffic data exceeds a threshold.

* * * * *